United States Patent

Louvel

[11] Patent Number: 5,897,997
[45] Date of Patent: Apr. 27, 1999

[54] REACTOR FOR IMPLEMENTING CHEMICAL REACTIONS INVOLVING A BIOMASS

[75] Inventor: Luc Louvel, Lyon, France

[73] Assignee: Rhone-Poulenc Chimie, Courbevoie, France

[21] Appl. No.: 08/952,461

[22] PCT Filed: May 14, 1996

[86] PCT No.: PCT/FR96/00729

§ 371 Date: Nov. 13, 1997

§ 102(e) Date: Nov. 13, 1997

[87] PCT Pub. No.: WO96/36567

PCT Pub. Date: Nov. 21, 1996

[30] Foreign Application Priority Data

May 19, 1995 [FR] France .................................. 95 06001

[51] Int. Cl.$^6$ ........................................................ C12M 1/12
[52] U.S. Cl. ................................. 435/294.1; 435/297.2; 435/296.1; 435/308.1
[58] Field of Search .......................... 435/289.1, 293.1, 435/295.1, 295.2, 296.1, 297.2, 297.3, 308.1, 813; 210/150, 151, 195.3, 623, 624

[56] References Cited

U.S. PATENT DOCUMENTS 938,075 10/1909 Reisert .
3,738,488 6/1973 Hondermark .
4,391,703 7/1983 Crosby .
4,683,062 7/1987 Krovak et al. .
5,221,470 6/1993 McKinney .
5,518,618 5/1996 Mulder et al. .

FOREIGN PATENT DOCUMENTS 0 191 356 8/1986 European Pat. Off. ............ 435/308.1
2 317 232 2/1977 France .

OTHER PUBLICATIONS

Patent Abstracts of Japan. vol. 001, No. 317 (C–452), Oct. 1987.

Primary Examiner—William H. Beisner
Attorney, Agent, or Firm—Katherine L. Carleton

[57] ABSTRACT

A reactor comprises a cylindrical body (1) with a lower cylindrical portion (5) and an upper cylindrical portion (6) of greater diameter than the lower portion, mutually connected by a connecting ring (7), a filtering ring (2) arranged in the lower part of the upper portion (6) and supported by the connecting ring (7), and an inner cylindrical member (3) having, at the lower end thereof, a flange (8) bearing on the filtering ring (7) and providing a gap (9) between the outer periphery of the flange (8) and the inner wall of the upper portion (6), wherein all the rotary elements are coaxially disposed.

8 Claims, 3 Drawing Sheets

REACTOR FOR IMPLEMENTING CHEMICAL REACTIONS INVOLVING A BIOMASS

BACKGROUND OF THE INVENTION

1. Field of the Invention

The present invention relates to a reactor intended for the implementation of chemical reactions involving a biomass.

Particularly in the field of water purification, many reactions can be carried out by living organisms that are capable of breaking down various organic materials during their biological processes, e.g., the respiratory process.

Thus, the elimination of organic pollution from aqueous effluents is achieved by maintaining, in vats containing the effluents to be treated, the development of a biomass for a given period of time, at the conclusion of which the biomass is separated by decantation of the liquid aqueous phase.

The term "biomass" refers to a population of living microorganisms, such as microbes, bacteria, or protozoa. In the water-purification field, the active biomass is usually referred to as "sludge".

To implement a purification treatment on a specific effluent, many parameters need to be studied, including in particular the compatibility of the treating sludge with the polluted effluent (i.e., to determine the presence, if any, in the effluent of substances that inhibit the properties of the sludges); the useful sludge concentration; the temperature; and, if necessary, the useful quantity of dissolved oxygen. The corresponding tests need to be carried out in large numbers, and therefore (for reasons of time and expense) at a much smaller scale than the scale of the purification plant.

2. Description of the Related Art including information disclosed under 37 CFR 1.97 and 1.98.

Small- or medium-volume model systems are already known that allow the study of treatment by sludge culture in an aerated medium. These model systems consist of an aeration vat, in which the sludges perform the purification in an aerated medium, and which is connected by means of an overflow system to a decantation vat. The sludges that accumulate in the decantation vat are recycled into the aeration vat by means of a tapping or bleed-off pipe. However, these systems have the disadvantage of needing maintenance at increasingly frequent intervals as the volume of the system decreases. In fact, the sludges tend to accumulate in the pipes with small cross-sections that make up the overflow system or the recycling circuit for the decanted sludges, such that the resulting blockages require interruption of the test so that the components can be cleaned.

Reactors consisting of a single aeration/decantation vat exist, but allow tests to be performed only semi-continuously. In such tests, a pre-determined amount of the effluent to be treated is introduced into the reactor containing the aerated sludge. The aeration is then halted in order to allow the sludge to decant, and the treated supernatant liquid is extracted. However, these systems do not allow the study of phenomena that require treatment of a large quantity of effluents, for example, study of the problems caused by an organic pollutant acting through a threshold effect.

Thus, there is still a need for a reactor that allows accurate simulation of the large-scale implementation of a biological process and that allows the study of all of the associated operational parameters.

The purpose of the present invention is to meet this need.

BRIEF SUMMARY OF THE INVENTION

Accordingly, the invention relates to a reactor intended for the implementation of chemical reactions involving a biomass and a reaction liquid, characterized by the fact that the said reactor includes:

A cylindrical body that includes a lower cylindrical portion and an upper cylindrical portion, whose diameter is larger than that of the lower portion, joined to each other by a connecting ring;

A filtration ring located in the lower part of the upper portion and resting on the connecting ring; and An inner cylindrical component that has, at its lower extremity, a flange which rests on the filtration ring and forms a gap between the outer periphery of the flange and the inner wall of the upper portion, with all of the rotational elements being arranged coaxially.

DETAILED DESCRIPTION OF THE INVENTION

The centering means may advantageously include a centering ring located inside the upper portion and force-fitted between the outer wall of the said inner cylindrical component and the inner wall of the said upper portion.

The purpose of the space located inside the inner component and inside the lower portion is to receive the biomass and the reaction liquid. The space located between the inner cylindrical component and the upper cylindrical portion forms a holding trough for the post-reaction liquid filtered through the filtration ring.

The reactor preferably operates continuously. To do so, it may include means for supplying the reaction liquid and means for sampling the filtered liquid contained within the space located between the upper cylinder and the inner cylindrical component. The reaction-liquid supply means advantageously discharge above the filling level in the reactor.

The reactor preferably also includes means for stirring the reaction mass, which means are located in the lower cylindrical portion.

The reactor in accordance with the invention is adapted to the implementation of reactions with a biomass in a non-aerated or aerated medium.

In the former case, the reactor is advantageously equipped with mechanical means for stirring the reaction mass, which means are preferably located at the bottom of the lower cylindrical portion.

In the latter case, the reactor is equipped with means for the introduction of a gas, and particularly for the introduction of a gas containing oxygen, with the said gas-introduction means also serving as means for stirring the reaction mass. The gas-introduction means are preferably located at the bottom of the cylindrical body, near the axis of the rotating elements. The gas-introduction means advantageously include a device for controlling the size of the gas bubbles.

In a particularly advantageous manner, the said gas-introduction means are adapted so as to create a rising current of gas bubbles located near the axis of the rotating elements.

In a highly advantageous embodiment, particularly for aerated reactors, the dimensions of the filtration ring are such that the said ring is fitted externally against the cylinder of the upper portion and its inner periphery is offset in relation to the lower portion, and the cylindrical part of the inner cylindrical component is offset in relation to the inner periphery of the filtration ring.

The invention also relates to devices for the implementation of several reactions, and particularly of two consecutive reactions, each of which involves a biomass, which device includes several, and particularly two, reactors in accordance with the invention, which reactors are equipped with reaction-liquid supply means and means for sampling the filtered liquid. The two reactors are connected in series, with the reaction-liquid supply means of one reactor being connected to the sampling means for the filtered liquid contained in the upper portion of the other reactor.

Thus, a concatenation of multiple reactors can be created, with each reactor operating in an aerated medium or with each reactor operating in a non-aerated medium, or else with at least one reactor operating in an aerated medium and at least one reactor operating in a non-aerated medium.

BRIEF DESCRIPTION OF THE SEVERAL VIEWS OF THE DRAWINGS

The present invention will now be described with reference to the attached drawings, on which.

The reactor shown in FIG. 1 includes essentially a cylindrical tubular body [1], a filtration ring [2], an inner cylindrical component [3], a gas-bubble diffusion device [4], and means for supplying the effluent to be treated and means for sampling the treated liquid, which will be described in detail hereinbelow.

The tubular body [1] includes a cylindrical lower portion [5] with a conical bottom and a cylindrical upper portion [6], which is coaxial with the upper portion and whose inside diameter [D6] is larger than the inside diameter [D5] of the lower portion [5]. The upper portion [6] is open at its upper end.

The cylinders that form the lower portion [5] and the upper portion [6] are connected transversely by a flat ring [7]. The flat connecting ring [7] may be replaced by any other suitable annular component, such as a conical header.

Figure 1:
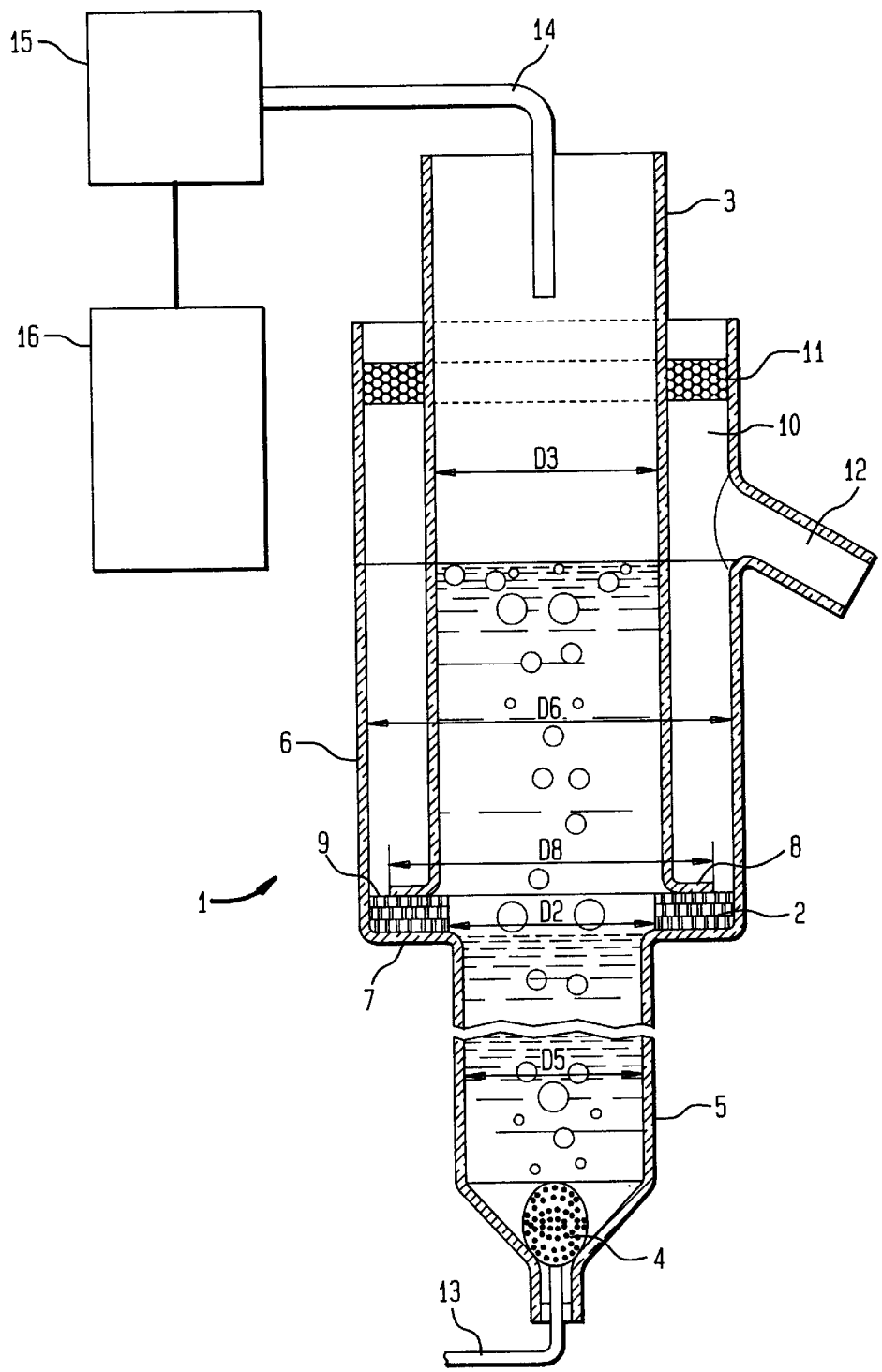
FIG. 1 is a longitudinal cross-sectional view of a reactor in accordance with the invention, which is intended for the implementation of a reaction in an aerated medium.

In the embodiment shown in FIG. 1, the connecting ring [7] serves as a flat bottom plate, and is pierced by an axial opening that allows the internal spaces of the upper portion [6] and lower portion [5] to communicate with each other.

The filtration ring [2] is located on the flat bottom of the upper cylindrical portion [6] formed by the connecting ring [7], so as not to extend beyond the opening of the lower cylindrical portion [5]. The inside diameter of the ring [2] is equal at least to the inside diameter [D5] of the cylindrical component [5].

The ring [2], whose inside diameter [D2] is larger than the inside diameter [D5] of the lower portion [5], is coaxial with the cylindrical body [1]. Thus, the filtration material is offset in relation to the lower portion [5]. This offset is advantageously on the order of 1 to 2 mm. The outer periphery of the filtration ring [2] follows the inner contour of the upper portion [6].

The filtration ring [2] may be made of a filter material that is suitable for use with the reaction mixture, and specifically for use with the biomass utilized. The volume of the interstices of the filter material is such that the filter material does not allow the sludges to infiltrate into the ring [2]. Fibrous materials are preferred, such as the materials marketed by the 3M Company under the trade name Scotch Brite, or expanded synthetic materials in the form of foam.

The cylindrical component [3] is located inside the upper portion [6], and its inside diameter [D3] is smaller than the inside diameter [D6] of this upper portion [6]. At its lower extremity, it has a flange [8] that rests on the filtration ring [2], which is thereby held in place.

The diameter of the inner cylindrical component [3] is larger than the diameter [D2]. The inner cylindrical component [3] is also coaxial with the cylindrical body [1], so that it itself is offset in relation to the filter material. This offset is advantageously on the order of 2 to 4 mm. The flange [8] that rests on the filtration ring [2] is annular in form, and its outside diameter [D8] is smaller than the inside diameter [D6] of the upper portion. Thus, the inner cylindrical component [3] forms a free space [9] above the filter material, near both the inner periphery and the outer periphery of the filtration ring [2].

The inner cylindrical component [3] is held in place in the body [1] by means of a centering ring [11] made of a compressible plastic material, such as a polyurethane foam, whose dimensions are such that the ring can be force-fitted between the inner cylindrical component [3] and the inner wall of the upper portion [6].

The space located between the cylindrical part of the inner component [3] and the inner wall of the upper cylindrical portion [6] forms a holding trough [10] that communicates with the inner part of the reactor via the free space [9] and via the interstitial spaces of the filter material in the ring [2].

A pipe [12] for sampling the liquid is connected at an intermediate point on the upper section [6]. However, other sampling means may also be envisioned, such for-example a sampling pipe that extends into the said holding trough located in the inner space of the [upper] portion [6], around the inner cylindrical component [3].

The tubular body [1], the inner component [3], and the pipe may be made of any material that is suitable for use in the manufacture of chemical reactors. They are preferably made of glass, in order to allow an operator to monitor visually the progress of the reaction.

The cylindrical body [1] is equipped with gas-introduction means located at the bottom of the lower section [5]. These means consist of a gas-bubble diffusion device (or diffuser) [4], which in particular may consist of a block of solid porous material, that is connected to a gas-inlet pipe [13]. The diffuser [4] is located near the axis of the tubular body [1], so as to create a rising current of gas bubbles along this axis.

Means for supplying the reaction liquid, which are connected to the reactor, include a liquid-supply pipe [14] that discharges inside the inner cylindrical component [3]. A peristaltic pump [15] supplies the said pipe with the reaction liquid contained in a reservoir [16].

The operation of the reactor will now be described for the case involving the implementation of a process for the purification of aqueous effluents polluted by organic materials.

A predetermined amount of biomass (sludge) is placed in the lower portion [5] of the reactor body [1], together with a given amount of the aqueous effluents to be treated. Air is injected through the diffuser [4], thereby causing the sludges to disperse in the liquid medium and causing the liquid level in the reactor to rise. The flow rate of the injected air is regulated in accordance with the desired operating conditions, including in particular the concentration of dissolved oxygen at which the sludges are most effective. In this regard, the reactor may also include a probe that measures the amount of dissolved oxygen. However, the flow rate must be high enough to keep the sludges in suspension in the reactor.

The biomass then starts to consume and break down the organic materials contained in the aqueous effluent. The breakdown of the organic materials can be achieved through a respiratory process, with the release of carbon dioxide, or with the aid of the development of microorganisms. It can be estimated that each type of process consumes approximately one-half of the organic material contained in the effluent.

The liquid to be treated is then supplied continuously to the reactor, through the pipe [14] and by means of the pump [15], which delivers a flow rate of 15 to 120 ml per hour. These flow rates produce a drop-by-drop feed that allows the effluent to be mixed rapidly with the reaction mass.

The introduction of the liquid and the development of the biomass cause a steady increase in the level of the liquid in the reactor. When the level of the liquid rises above the lower portion [5], the reaction medium is contained inside the cylindrical element [3], while part of the liquid is filtered through the filtration ring [2]. The inner space in the upper portion [6] located around the cylindrical component [3] forms a holding trough [10] for the treated and filtered effluent, into which the filtered liquid can enter, thanks to the free space [9] between the flange [8] and the inner wall of the upper cylinder [6].

When the level of the liquid in the reactor reaches the level of the liquid sampling pipe [12], the treated and filtered liquid flows out of the reactor through the overflow pipe. The height of the point at which the pipe [12] is connected to the upper portion of the reactor body may advantageously be selected so as to avoid short-circuiting the path followed by the effluent to be treated, i.e., in order to prevent any of this effluent, as supplied by the pipe [14], from passing through the upper portion [6] and being filtered directly, without reacting with the biomass.

The pipe [14] that supplies the effluent to be treated preferably discharges into the reactor below the level of the overflow pipe.

Because of the configuration of the reactor, filtration takes place with no blockage or clogging problems caused by the accumulation of sludges on the filter. Filtration appears to take place tangentially through the ring; that is, the flow of liquid to be filtered is parallel to the surface of the filter and perpendicular to the direction of filtration.

Figure 2:
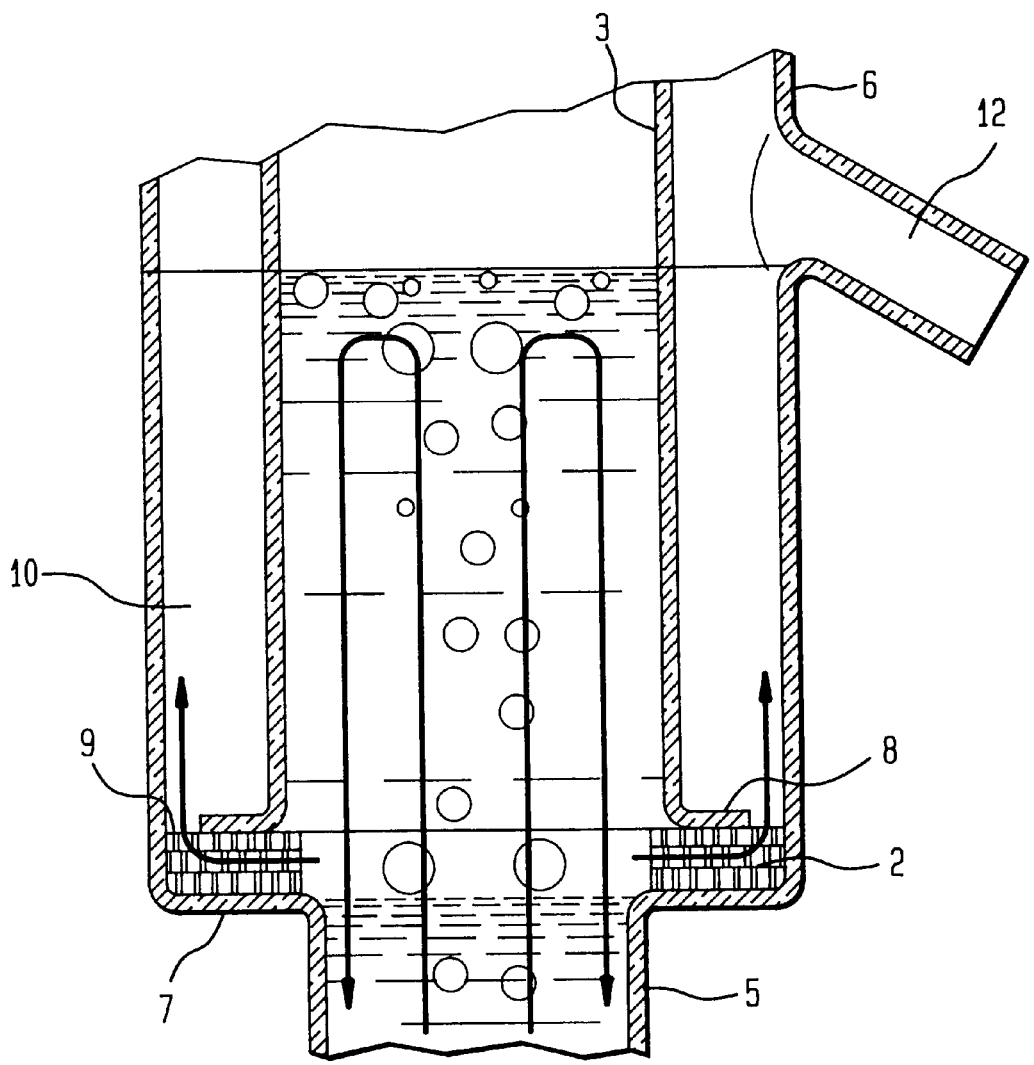
FIG. 2 shows the central part of the same reactor, in an enlarged longitudinal cross-sectional view, with a diagrammatic representation of the flow lines for the liquid in this reactor.

FIG. 2 shows, in summary form, the flow lines presumably followed by the liquid in the reactor.

The air bubbles that rise toward the surface appear to carry some of the liquid with them, thereby creating a rising current of liquid located at the center of the reactor. At the surface of the liquid, the air bubbles disperse and escape into the free space from the entire surface area of the liquid. When this happens, the liquid is carried toward the periphery of the reactor and, as a result of the effect of the rising central current created by the air bubbles, forms a descending peripheral current that flows tangentially toward the accessible surface of the filter material.

Blocked- or clogged-filter problems occur when filtration takes place frontally. When the liquid to be filtered flows in the direction of filtration, the passage of the liquid through the filter creates a force that drives the solid particles into the filter, where they accumulate rapidly.

With the reactor in accordance with the invention, crosswise currents are prevented from forming near the filter material, which currents could carry sludge particles, in suspension, into the filter material or cause them to accumulate on its surface. Therefore, the reactor can operate continuously for several weeks, with no observed blockage or clogging of the filtration ring.

The embodiment shown in FIG. 2, in which the flange [8] is offset in relation to the ring [2], which itself is offset in relation to the edge of the connector [7], is very advantageous in terms of eliminating the blockage or clogging problem. This configuration allows a sort of continuous "cleaning" of the filter to take place with a very high degree of effectiveness.

This type of reactor can be used advantageously to purify aqueous effluents that have been contaminated by organic materials, through the use of nitrifying sludges.

The chemical nitrification reaction consists of converting the nitrogen that is present in the effluents, in the form of ammonium ions ($NH_4^+$), into nitrites ($NO_2^-$) or nitrates ($NO_3^-$). Microorganisms are currently employed in purification plants to achieve this reaction, which they can accomplish in the presence of oxygen.

The aqueous effluent to be treated is introduced into the reactor via the supply pipe [14] and reacts with the biomass. After filtration, an aqueous phase that contains nitrogen, in the form of nitrite or nitrate ions, is recovered from the holding trough in the [upper] portion [6].

Figure 3:
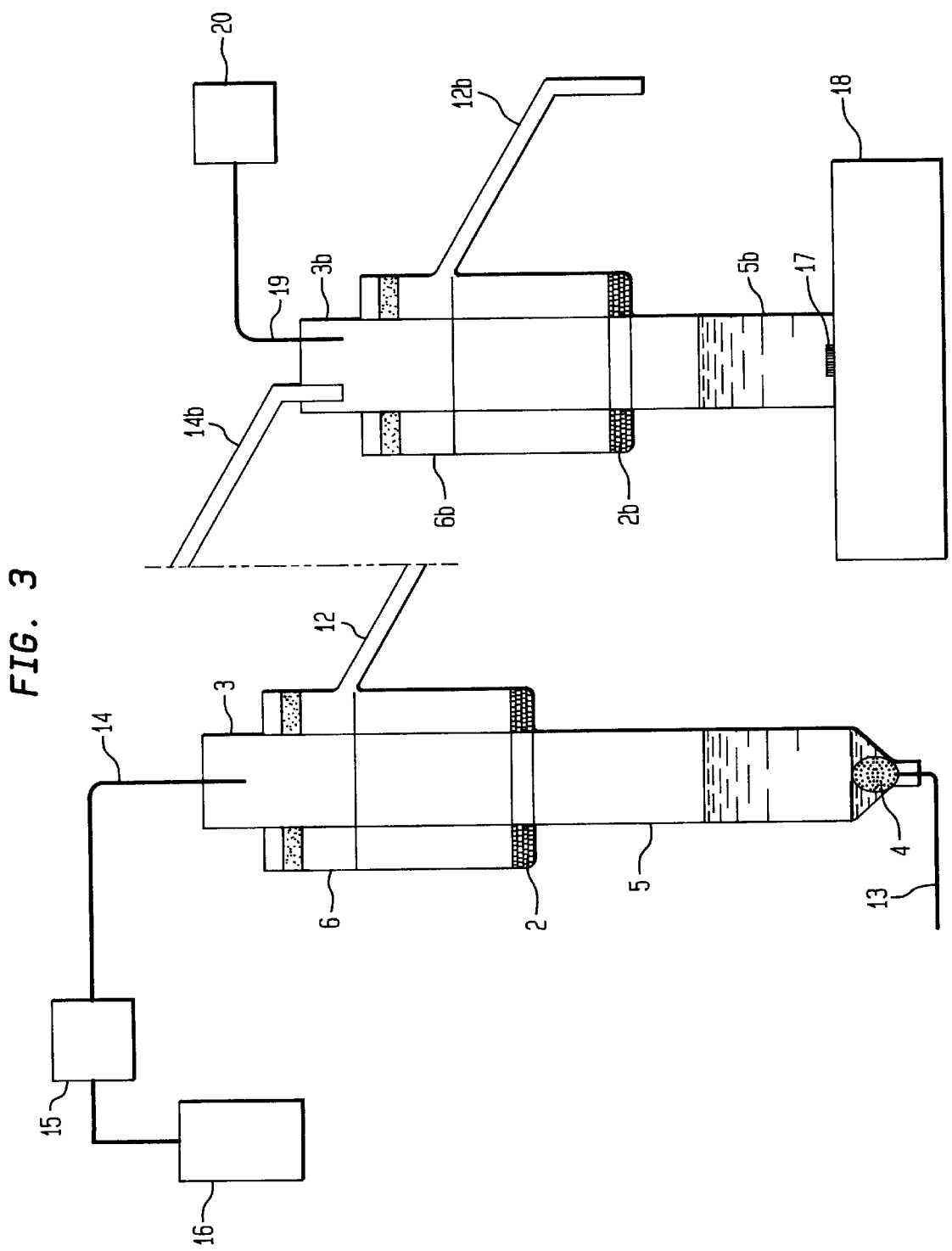
FIG. 3 shows a device in accordance with the invention, which combines a reactor operating in an aerated medium and a reactor operating in a nonaerated medium.

FIG. 3 shows a device that combines an aerated reactor, as defined hereinabove, and a non-aerated reactor, similar to the first one but including, instead of the gas-introduction device, a mechanical device for stirring the reaction mass, such as a magnetized bar [17] controlled by a magnetic stirring device [18].

All of the elements of the second reactor, which are identified by a reference number, as described above for the first reactor, to which the letter "b" has been added, are identical to the elements of the first reactor that are identified by the respective reference number.

This reactor operates in much the same way as the first reactor, except for the fact that the reaction mass is stirred mechanically. This stirring is generally regulated in such a way that an essentially homogeneous suspension is obtained throughout the entire height of the reactor, without shearing the sludge particles or forming currents that could cause the filtration ring to become blocked or clogged. The device shown in FIG. 3 can be used to achieve the purification of aqueous effluents in two stages, i.e., a first stage consisting of nitrification in an aerated medium, followed by a denitrification stage in a non-aerated medium.

The denitrification reaction consists of using microorganisms to reduce to gaseous nitrogen the nitrites and nitrates contained in an effluent that has been treated by nitrification. This reaction can be accomplished by the same microorganisms that were used to accomplish the nitrification in an aerated medium. What they do is "respirate" the oxygen contained in the $NO_2^-$ and $NO_3^-$ ions in an anaerobic or anoxic medium. To do this, they need a carbon source, which usually consists of methanol. At the end of this two-stage process, the ammonia nitrogen contained in the aqueous effluents is eliminated completely.

The effluent treated in the first nitrification reactor and contained in the holding trough of this reactor is supplied continuously to the second reactor via the overflow pipe [12], which is extended to form a liquid-supply pipe [14b].

A liquid-supply pipe [19], which discharges into the inner cylindrical component [3b] of the second reactor, continuously introduces into the reaction medium a carbon source, such as methanol, contained in a reservoir [20].

The filtrate recovered in the holding trough in the upper section [6b] contains almost no nitrogen, and can be recovered at the outlet of the device via the overflow pipe [12b].

The present invention will now be illustrated by the following examples:

EXAMPLE 1

An aerated reactor of the type shown in FIG. 1, with a working volume of 1 liter, was used to achieve the purification of urban waste water by means of nitrifying sludges used in the plant that customarily treats this waste water. The sludges were present in the form of flocculent aggregates with an average size of 1 to 2 mm.

The filtration ring [2] was formed by the superimposition of two fibrous materials sold by the 3M Company under the brand name Scotch Brite, of standard quality, each of which was 5 mm thick.

The interstitial spaces of this material are small enough to prevent aggregates from 1 to 2 mm in size from penetrating into the filtration ring. Only free sludge particles that are smaller than 100 μm are not trapped by the filter, and pass into the holding trough along with the filtrate. This is entirely acceptable, provided that these particles stay in suspension in the decantation liquid in a purification plant. From this point of view, the purification conditions in the reactor are typical of the actual conditions in the plant.

The filtration ring [2] was offset by approximately 1 to 2 mm from the flat bottom [7] of the upper section [6]. The inner cylindrical component [3] was also offset by 2 to 4 mm from the inner edge of the ring [2] made of fibrous material.

The concentration of organic matter in the aqueous effluent to be treated, expressed in terms of the chemical oxygen demand (C.O.D.) of the effluent, was approximately 350 mg of oxygen per liter.

The average concentration of the sludges in the reactor was from 2 to 3 g of solid matter per liter. The sludge concentration varied over time, in accordance with the development of the microorganisms. Therefore, a given amount of sludge was sampled regularly, in order to maintain an essentially constant average sludge concentration and/or an average age (i.e., duration of their presence in the reactor) for the sludges.

Under the operating conditions described in this example, the average age of the sludges, which corresponds to the ratio between the total amount of sludge and the amount of sludge eliminated per day (which is on the order of 1 to 5% per day), was 20 days.

The daily flow rate of the supply of aqueous effluent to be treated was 2.5 liters per day. Therefore, the duration of the hydraulic presence of the effluent in the reactor, which corresponds to the ratio between the working volume of the reactor and the flow rate of the effluent supply, was approximately 10 hours.

Under these conditions, the reactor could operate maintenance free, and with no blockage or clogging of the filter, for several weeks.

Thus, high-quality purification was obtained. The efficiency of the elimination of the chemical oxygen demand was 95%, and the efficiency of the elimination of the ammonia form of nitrogen was 98%.

These performance levels are very close to those of the purification plant as designed and modeled.

EXAMPLE 2

The same reactor used in Example 1 was used to purify industrial aqueous effluents from an organic manufacturing and fermentation plant.

The chemical oxygen demand of these effluents was 2,000 mg/liter, and the ratio between the biological oxygen demand [B.O.D.] and the chemical oxygen demand was approximately 0.4.

The sludges utilized came from a purification plant that customarily treated these effluents, and were used at an average concentration in the reactor of 6 to 9 g of solid matter per liter.

The average age of the sludges during this trial was 20 days, and the duration of the hydraulic presence of the effluents was 17 hours.

Under these conditions, the reactor operated for several weeks without maintenance and with no observed blockage or clogging of the filter.

The reactors in accordance with the invention are applied particularly usefully in the simulation of purification treatment.

Their size may vary, depending on the phenomena to be studied.

Reactors with a relatively large working volume, e.g., on the order of 1 to 10 liters, should be utilized when the input flow rate (in terms of the organic material content) is rather small or when large volumes of sludge samples need to be taken for analysis.

Reactors with a working volume as small as 300 ml can be utilized to observe most of the usual phenomena and to study the corresponding parameters. Their low production cost and maintenance cost (with virtually no maintenance for weeks at a time) allows them to be used in groups of two or more at once, so that multiple tests can be carried out simultaneously.

Specialists outside the purification field will be able to identify the various fields in which the reactor in accordance with the invention can be applied.

What is claimed is:

1. A reactor for the implementation of chemical reactions involving a biomass and a reaction liquid, wherein the said reactor comprises:

(1) a cylindrical body (1) including a cylindrical lower portion (5) and an upper cylindrical portion (6), which is coaxial with said upper portion and whose diameter is larger than that of the lower portion, joined to each other by a connection ring (7);

(2) a filtration ring (2) located in the lower part of the upper portion (6) and resting on the connecting ring (7); and (3) an inner cylindrical component (3) which is coaxial with the cylindrical body (1) and which has, at its lower extremity, a flange (8) which rests on the filtration ring (2) and forms a free space (9) between the outer periphery of the flange (8) and the inner wall of the upper portion (6).

2. A reactor according to claim 1, comprising means for centering the inner cylindrical component (3), which includes a centering ring (11) located inside the upper portion (6) and force-fitted between the outer wall of the inner cylindrical component (3) and the inner wall of the said upper portion (6).

3. A reactor according to claim 2, further comprising means (14) (15) (16) for supplying the reaction liquid and means (12) for sampling the filtered liquid contained within the space located between the upper cylinder (6) and the inner cylindrical component (3).

4. A reactor according to claim 3, further comprising stirring means located in the lower portion (5).

5. A reactor according to claim 4, wherein the stirring means include means (4) (13) for the introduction of a gas.

6. A reactor according to claim 5, wherein said means for the introduction of a gas are adapted to create a rising current of gas bubbles located near the axis of the tubular body (2).

7. A device for the implementation of two consecutive reactions, each of which involving a biomass, wherein said device comprises two reactors according to claim 3, wherein the reaction-liquid supply means of the second reactor (14b) are connected to the sampling means (12) for the filtered liquid contained in the upper portion of the first reactor.

8. A reactor according to claim 1, wherein the dimensions of the filtration ring are such that said ring is fitted externally against the inner wall of the upper portion (6) and its inner contour is offset in relation to the lower portion (5), and wherein the cylindrical part of the inner cylindrical component (3) is offset in relation to the filtration ring (2).

* * * * *